(12) United States Patent
Nishio et al.

(10) Patent No.: US 8,872,982 B2
(45) Date of Patent: Oct. 28, 2014

(54) TRANSMISSION DEVICE AND RECEPTION DEVICE FOR BASEBAND VIDEO DATA, AND TRANSMISSION/RECEPTION SYSTEM

(75) Inventors: Toshiro Nishio, Osaka (JP); Yutaka Nio, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/353,140

(22) PCT Filed: Jan. 30, 2012

(86) PCT No.: PCT/JP2012/000564
§ 371 (c)(1),
(2), (4) Date: Apr. 21, 2014

(87) PCT Pub. No.: WO2013/076881
PCT Pub. Date: May 30, 2013

(65) Prior Publication Data
US 2014/0267902 A1    Sep. 18, 2014

(30) Foreign Application Priority Data

Nov. 25, 2011   (JP) .................................. 2011-257534
Dec. 5, 2011    (JP) .................................. 2011-265462

(51) Int. Cl.
*H04N 5/38*        (2006.01)
*H04N 5/44*        (2011.01)
*H04N 7/01*        (2006.01)

(52) U.S. Cl.
CPC ............... *H04N 7/0122* (2013.01); *H04N 5/44* (2013.01); *H04N 5/38* (2013.01)
USPC ........................................ 348/723; 348/725

(58) Field of Classification Search
USPC ............ 348/723–726, 464, 467, 521; 725/67, 725/68, 98, 100, 118, 131, 148, 151; 375/219, 295, 316, 354, 356
IPC .............................. H04N 7/00,5/06, 5/38, 5/44
See application file for complete search history.

(56) References Cited

U.S. PATENT DOCUMENTS 6,307,891 B1   10/2001   Hein et al.
7,557,801 B2    7/2009   Ozaki (Continued)

FOREIGN PATENT DOCUMENTS

JP    2007-240741    9/2007
JP    2008-103806    5/2008

(Continued)

OTHER PUBLICATIONS

International Search Report issued Feb. 21, 2012 in corresponding International (PCT) Application No. PCT/JP2012/000564.

(Continued)

*Primary Examiner* — Sherrie Hsia
(74) *Attorney, Agent, or Firm* — Wenderoth, Lind & Ponack, L.L.P.

(57) ABSTRACT

In a transmission device: a controller performs a control of reading, from information regarding video specification, information regarding a horizontal resolution and a vertical resolution that are supported by a reception device and information regarding frame rate that is supported by the reception device, and multiplexing, to the video signal during a blanking period of the video signal, information indicating a reduce frame rate that is selectable from a range supported by the reception device; and a transmitter transmits baseband video data at the reduced frame rate.

7 Claims, 9 Drawing Sheets

(56) References Cited

U.S. PATENT DOCUMENTS

| | | |
|---|---|---|
| 2004/0002327 A1 | 1/2004 | Tanaka |
| 2005/0259948 A1 | 11/2005 | Ando |
| 2006/0242669 A1 | 10/2006 | Wogsberg |
| 2006/0284793 A1 | 12/2006 | Park et al. |
| 2008/0065916 A1 | 3/2008 | Liu et al. |
| 2008/0084834 A1 | 4/2008 | Stanek |
| 2008/0180551 A1 | 7/2008 | Koike |
| 2009/0033969 A1 | 2/2009 | Inoue |
| 2009/0251479 A1 | 10/2009 | Choi et al. |
| 2010/0026790 A1* | 2/2010 | Ohba et al. ............... 348/723 |
| 2010/0214480 A1 | 8/2010 | Kitamori |
| 2010/0253856 A1* | 10/2010 | Sato et al. ............... 348/723 |

FOREIGN PATENT DOCUMENTS

| | | |
|---|---|---|
| JP | 2008-187536 | 8/2008 |
| JP | 2009-272778 | 11/2009 |
| WO | 2007/105548 | 9/2007 |

OTHER PUBLICATIONS

"High-Definition Multimedia Interface", Specification Version 1.3a, (Nov. 10, 2006, HDMI Licensing, LLC).

"A DTV Profile for Uncompressed High Speed Digital Interfaces", CEA Standard, CEA-861-D, (Jul. 2006, Consumer Electronics Association).

\* cited by examiner

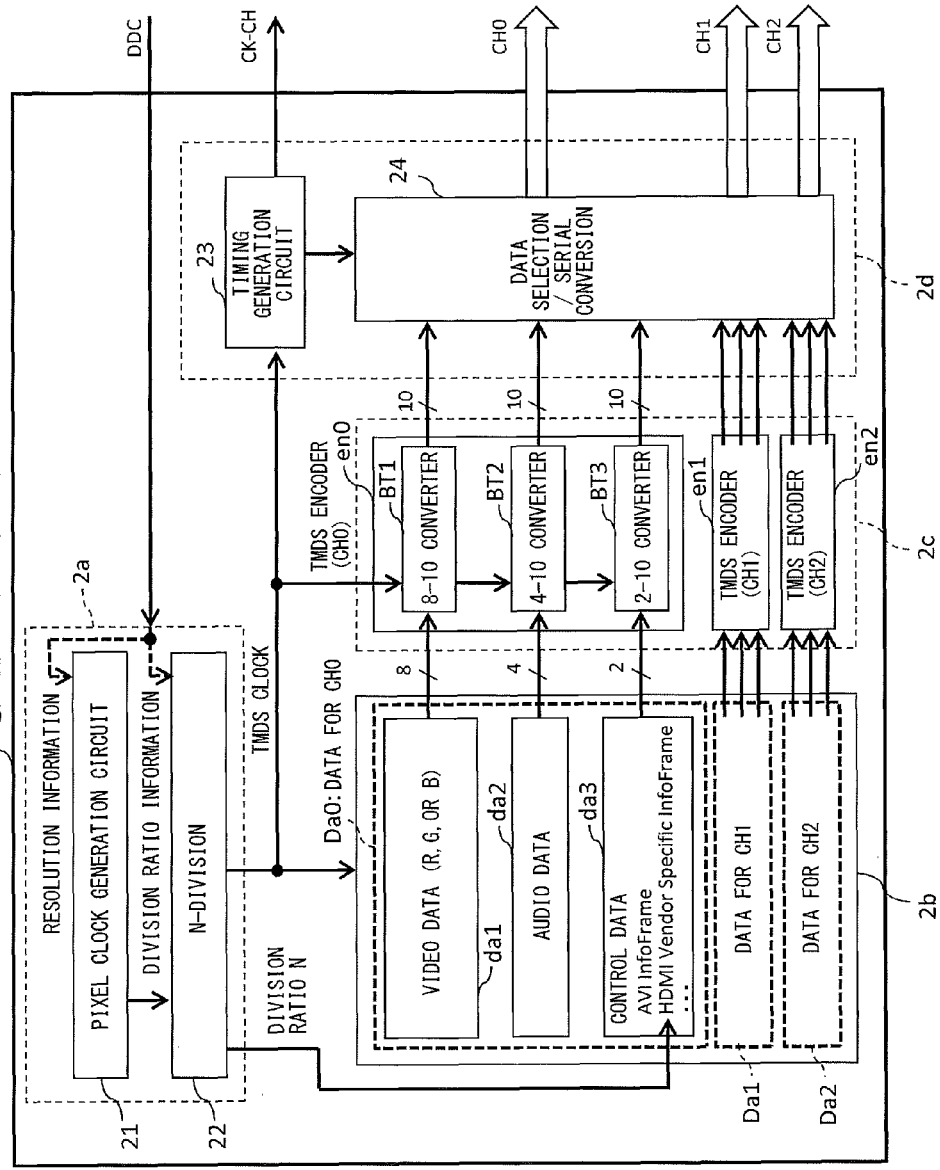
F I G. 1

F I G. 5

| Byte # | 7 | 6 | 5 | 4 | 3 | 2 | 1 | 0 |
|---|---|---|---|---|---|---|---|---|
| 0 | Vendor-specific tag code (=3) | | | Length (=N) | | | | |
| 1 | 24-bit IEEE Registration Identifier (0X 00 0C 03) (least significant byte first) | | | | | | | |
| 2 | | | | | | | | |
| 3 | | | | | | | | |

• • •

| n | DEFINED | DEFINED | DEFINED | Low_Reflesh | Rsvd (0) | Rsvd (0) |
|---|---|---|---|---|---|---|
| n+1 | DEFINED | | DEFINED | | | |
| n+2 | DEFINED | | | | | |
| ... | ... | | | | | |
| | N VALUE | | | | | |

F I G. 6

| Packet Byte # | 7 | 6 | 5 | 4 | 3 | 2 | 1 | 0 |
|---|---|---|---|---|---|---|---|---|
| PB0 | Checksum ||||||||
| PB1...3 | 24-bit IEEE Registration Identifier (0X 00 0C 03) ||||||||
| PB4 | HDMI_Video_Format =100 ||| Rsvd | Rsvd | Rsvd | Rsvd | Rsvd |
| (PB5) | D ||||||||
| ...PB(Nv) | Reserved (0) ||||||||

TRANSMISSION DEVICE AND RECEPTION DEVICE FOR BASEBAND VIDEO DATA, AND TRANSMISSION/RECEPTION SYSTEM

TECHNICAL FIELD

The present invention relates to a baseband video data transmission/reception system capable of transmitting and receiving at least baseband video data. In more detail, the present invention relates to a baseband video/audio data transmission/reception system capable of transmitting and receiving video data with low power consumption, and a transmission device and a reception device included in the system.

BACKGROUND ART

In recent years, HDMI specification has been known as a transfer specification for baseband video/audio data transmission/reception systems. Baseband refers to be being uncompressed.

Video data is transmitted using three channels in HDMI specification. In addition, audio data or data used for control is time multiplexed to each video data and transmitted (e.g., cf. Non-Patent Literature 1 and Non-Patent Literature 2).

FIG. 9 shows the configuration of a transmission/reception system 101 including a configuration compliant with HDMI specification. The transmission/reception system 101 includes a transmission device 102 and a reception device 103. Digital cameras, video cameras, and DVD players etc., correspond to the transmission device 102, and television receivers and monitors etc., correspond to the reception device 103.

The transmission device 102 is a source device, and includes a microcomputer 102a, a video output circuit 102b, a TMDS output circuit 102c, and a transmitter 102d. The reception device 103 is a sink device, and includes an information storage 103a, a TMDS input circuit 103b, a memory 103c, and a synchronization generation circuit 103d.

In the transmission device 102, the microcomputer 102a reads, through a DDC (Display Data Channel), EDID (Extended Display Identification Data) stored in the information storage 103a formed with a ROM of the reception device 103, and examines which specification of HDMI specification that can be handled by the reception device 103. In the EDID, for example, video format in which the reception device 103 can display is described. The video format is specified by a VIC (Video Identification Code) (cf. Non-Patent Literature 2 for detail). The video format includes a resolution and a field rate.

In addition, the microcomputer 102a performs signal-processing control in the device, and, for example, performs a control of reading out recorded data from recording medium in the device to the video output circuit 102b and loading video data and audio data on a memory. The microcomputer 102a generates digital video signal after receiving the EDID from the reception device 103, and generates a VIC specifying the video format of the digital video signal. The VIC is transmitted in a packet named AVI InfoFrame.

The TMDS output circuit 102c performs encoding and parallel serial conversion of uncompressed data outputted from the video output circuit 102b. The transmitter 102d outputs serial data to a transmission path with TMDS (Transition Minimized Differential Signaling) method.

In the TMDS transmission path, three data channels (DATA0, DATA1, and DATA2) and one clock channel are used. In each data channel, video data of any one of R-data, G-data, or B-data, audio data, and control data are converted to differential signals and transmitted by the transmitter 102d. The differential signal is a signal that represents Hi/Lo in a single signal as voltage difference of two signals. The video data is assigned to a display period and is transmitted as raster scan data. The audio data and the control data are assigned to a blanking period that is a vertical blanking period and a horizontal blanking period, and are transmitted as packet data. The control data is transmitted as an AVI InfoFrame packet.

In the reception device 103, the TMDS input circuit 103b receives TMDS data and clocks from a receiver that is not shown, performs serial parallel conversion thereon, and then performs decoding of each data. The decoded data is retained in a reception memory in the memory 103c, and video data is written in a frame memory in the memory 103c from the reception memory based on a pixel clock transmitted by the synchronization generation circuit 103d. The AVI InfoFrame packet is analyzed as soon as it is received. The data that has been written in the frame memory is used for video display in response to various timing signals generated by the synchronization generation circuit 103d in accordance with the video format described in the AVI InfoFrame, and the audio data retained in the reception memory is used for audio output.

CITATION LIST

Non Patent Literature

[NPL 1] High-Definition Multimedia Interface Specification Version 1.3a (Nov. 10, 2006, HDMI Licensing, LLC)
[NPL 2] CEA-861-D (July 2006, Consumer Electronics Association)

SUMMARY OF THE INVENTION

Problems to be Solved by the Invention

However, with conventional technology, frames of the same image is continuously transmitted even when transmitting a still picture. In the transmission with the TMDS method, AC (alternating current) transmission is performed with NRZ (Non Return to Zero) method such that, for data of 1 and data of 0, current of plus and minus flows so as to switch within a twisted pair cable.

As shown in FIG. 10, in a transmitter Tx, switching between two output terminals of open drain occurs in cases of data D and data /D to become ON-state. Current outputted from a current source I differs regarding whether to flow through which one of two termination resistances $R_T$ connected to differential inputs of a receiver Rx via a transmission path of characteristic impedance $Z_0$ between data D and data /D, and switching of plus and minus of differential input voltages occurs. The two termination resistances $R_T$ are connected to reference voltage AVcc.

In such manner, transmission in the TMDS method generates swinging of differential signals every time each data is transmitted and received. In addition, the numerical swing becomes extremely large since video signals of 8 bits are converted to 10 bits by a TMDS encoder in consideration of transmission property in TMDS. Therefore, since alteration of 1 and 0 repeatedly occurs for a large number of times while frames of the same image are continuously transmitted during still image display, wasteful power consumption occurs due to operation of the transmitter and the receiver, and power loss associated with charge and discharge through a cable occurs.

In addition, while the same image is repeatedly transmitted and received, since an encoder and a decoder for transmission/reception data repeat the same operation, wasteful power consumption increases.

In recent years, digital interfaces represented by the above described HDMI have been mounted on mobile devices such as digital cameras and smart phones to enable displaying of high definition videos. However, since mobile devices are driven by a battery, if output is performed for continuously displaying videos, power is consumed quickly associated with the wasteful power consumption as described above.

As described above, when transmitting baseband video data, power consumption of a physical interface that performs the actual transmission and reception becomes a problem.

An object of the present invention is to provide a transmission device and a reception device, and a transmission/reception system for baseband video data having high affinity with the conventional HDMI specification and capable of further reducing power consumption.

Solution to the Problems

A transmission device of the present invention is configured to transmit, to a reception device, signals including a video signal, and includes: a controller configured to perform a control of reading information held by the reception device regarding a video specification that is supported, and transmitting the video signal that is supported by the reception device; and a transmitter configured to transmit the video signal in a form of baseband video data. When the reception device is in an output mode in which an identical image is extendedly shown in a predetermined number of multiple frames or more: the controller performs a control of reading, from the information regarding the video specification, information regarding a horizontal resolution and a vertical resolution that are supported by the reception device and information regarding a frame rate that is supported by the reception device, and multiplexing, to the video signal during a blanking period of the video signal, information indicating a reduced frame rate that is selectable from a range supported by the reception device; and the transmitter transmits the baseband video data at the reduced frame rate.

Furthermore, in the transmission device, the information indicating the reduced frame rate may be information regarding division ratio with respect to a frame rate prior to reduction.

Furthermore, in the transmission device, when the transmitter transmits a clock, it is possible to not reduce transmission rate of the clock in the output mode.

Furthermore, a reception device of the present invention is configured to receive signals containing a video signal, and includes: a storage configured to store information regarding a video specification that is supported including information regarding a frame rate that is supported; a receiver configured to receive signals containing a video signal formed from baseband video data; a frame memory in which the video signal received by the receiver is written; and a synchronization signal generator configured to generate a first timing at which the video signal is written in the frame memory from the receiver, and a second timing at which the video signal is read out from the frame memory. The receiver outputs, when information indicating a reduced frame rate and information indicating a horizontal resolution and a vertical resolution during a blanking period of the received video signal are superimposed, the information indicating the frame rate to the synchronization signal generator. The synchronization signal generator generates the first timing at a frame rate in accordance with the information regarding the horizontal resolution and the vertical resolution and the information indicating the reduced frame rate.

Furthermore, in the reception device, when the supported frame rate includes multiple values represented with a power of two, only a maximum value of the values represented by the power of two may be stored in the storage as information of a frame rate regarding each of the values represented by the power of two.

Furthermore, in the reception device, when a predetermined frame rate that is supported is common for a specific set of multiple video specifications, a mask field indicating that the information regarding the predetermined frame rate only applies to the specific set of multiple video specifications may be stored in the storage.

Furthermore, a transmission/reception system of the present invention includes: a transmission device configured to transmit signals containing a video signal, and a reception device configured to receive signals containing the video signal. The transmission device includes: a controller configured to perform a control of reading information held by the reception device regarding a video specification that is supported, and transmitting the video signal that is supported by the reception device; and a transmitter configured to transmit the video signal in a form of baseband video data. When the reception device is in an output mode in which an identical image is extendedly shown in a predetermined number of multiple frames or more: the controller performs a control of reading, from the information regarding the video specification, information regarding a horizontal resolution and a vertical resolution that are supported by the reception device and information regarding a frame rate that is supported by the reception device, and multiplexing, to the video signal during a blanking period of the video signal, information indicating a reduced frame rate that is selectable from a range supported by the reception device; and the transmitter transmits the baseband video data at the reduced frame rate. The reception device includes: a storage configured to store information regarding a video specification that is supported including information regarding a frame rate that is supported; a receiver configured to receive signals containing the video signal transmitted from the transmission device; a frame memory in which the video signal received by the receiver is written; and a synchronization signal generator configured to generate a first timing at which the video signal is written in the frame memory from the receiver, and a second timing at which the video signal is read out from the frame memory. The receiver outputs, when information indicating the reduced frame rate and information indicating a horizontal resolution and a vertical resolution during a blanking period of the received video signal are superimposed, the information indicating the reduced frame rate to the synchronization signal generator. The synchronization signal generator generates, at the reduced frame rate, the first timing in accordance with information indicating the reduced frame rate.

Advantageous Effects of the Invention

With the transmission device and the reception device, and the transmission/reception system for baseband video data of the present invention, it is possible to provide a baseband video/audio data transmission/reception system that has high affinity with the conventional HDMI specification and is capable of further reducing power consumption.

BRIEF DESCRIPTION OF THE DRAWINGS

FIG. 1 shows an embodiment of the present invention, and is a block diagram showing a configuration of a transmission device.

FIG. 5 is for describing a content of EDID containing VSDB in which information of a reduced frame rate is defined.

FIG. 6 is for describing a content of InfoFrame describing information of a reduced frame rate.

DESCRIPTION OF EMBODIMENTS

Embodiments of the present invention will be described with reference to the drawings.

In the following, unless mentioned otherwise in particular, a general outline of a transmission device and a reception device compliant with HDMI specification will be described. Therefore, terms used in the following can be interpreted by referring to HDMI specification (Non-Patent Literature 1 and Non-Patent Literature 2) as appropriate.

Figure 3:
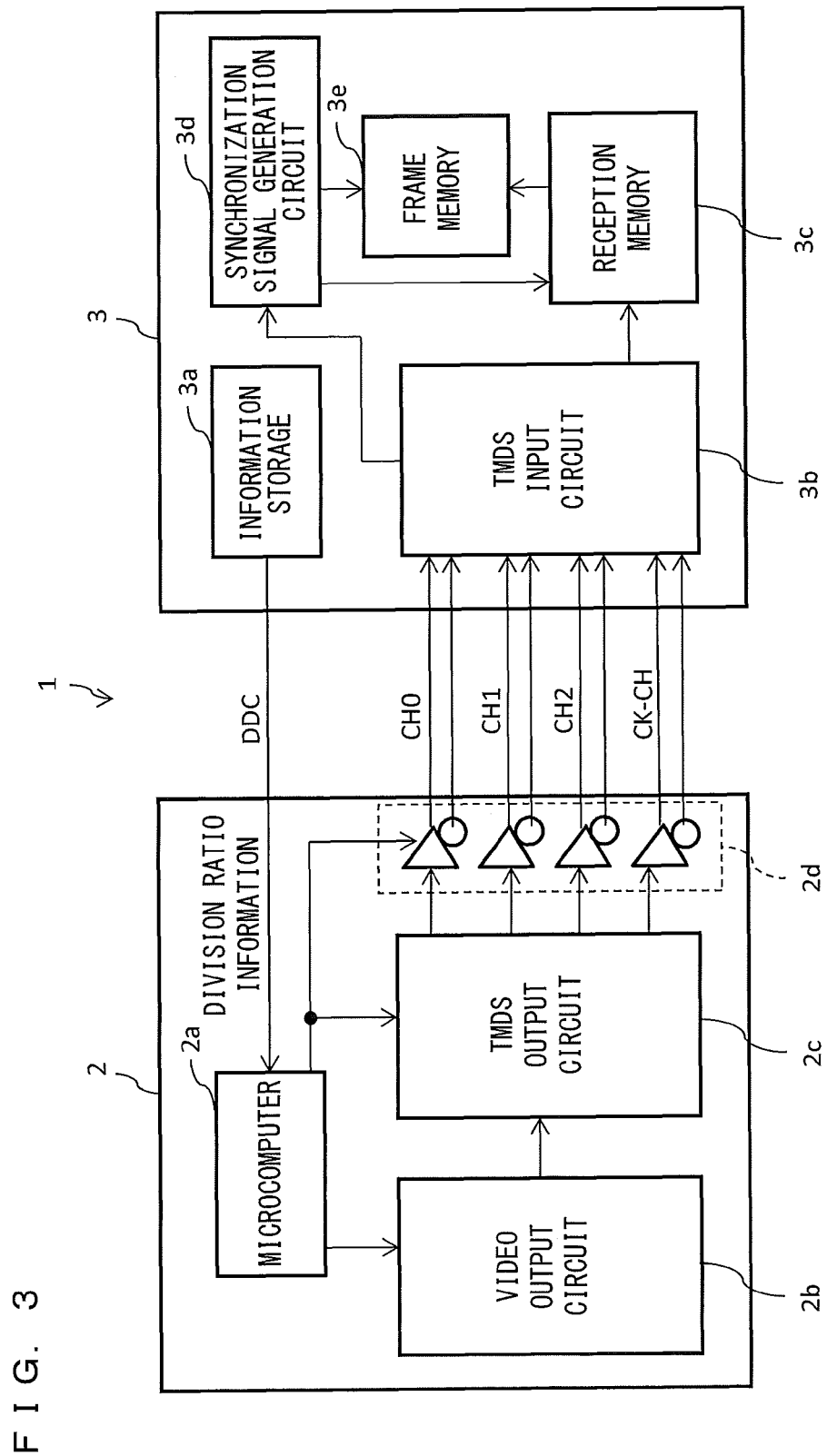
FIG. 3 shows an embodiment of the present invention, and is a block diagram showing a configuration of a transmission/reception system.

FIG. 3 shows a configuration of a transmission/reception system 1 for a video signal that is baseband video data, according to the present embodiment.

The transmission/reception system 1 includes a transmission device 2 and a reception device 3. Digital cameras, video cameras, and DVD players etc., correspond to the transmission device 2, and television receivers and monitors correspond to the reception device 3.

The transmission device 2 is a source device, and includes a microcomputer 2a, a video output circuit 2b, a TMDS output circuit 2c, and a transmitter 2d. The microcomputer 2a forms a controller; and the video output circuit 2b, the TMDS output circuit 2c, and the transmitter 2d form a transmitter. The reception device 3 is a sink device, and includes an information storage (storage) 3a, a TMDS input circuit 3b, a reception memory 3c, a synchronization signal generator 3d, and a frame memory 3e. The TMDS input circuit 3b and the reception memory 3c form a receiver.

FIG. 1 shows a detailed configuration of the transmission device 2.

The microcomputer 2a includes, a pixel clock generation circuit 21 and an N divider circuit 22, in addition to a processor and a register that are not diagrammatically represented. The pixel clock generation circuit 21 generates a pixel clock with a rate that matches the resolution used as a reference in a video specification, using an internal clock generated by an internal clock generation circuit of the microcomputer 2a. The reference resolution of a video specification conforms to information regarding a horizontal resolution and a vertical resolution supported by the reception device 3, among information regarding the video specification read-out from the information storage 3a of the reception device 3 through DDC. The N divider circuit 22 generates a TMDS clock in accordance with a frame rate specified based on division ratio information which is information regarding a frame rate supported by the reception device 3, among information regarding the read-out video specification.

Ordinarily, when video data of moving pictures is to be transmitted to the reception device 3, the N divider circuit 22 generates the TMDS clock specified by a standard frame rate prescribed in information regarding frame rate. More specifically, the N divider circuit 22 generates a TMDS clock whose division ratio is 1 with respect to the pixel clock generated by the pixel clock generation circuit 21, and outputs the TMDS clock to subsequent circuits. On the other hand, when the transmission device 2 is in an output mode for showing the same image extended in a predetermined number of multiple frames or more, as in the cases with still images, paused videos of moving pictures, and a slow-motion reproduction video of moving pictures; if a frame rate specified in the information regarding frame rate and is reduced to 1/N of the standard frame rate exists, the N divider circuit 22 generates a TMDS clock obtained through frequency dividing the pixel clock generated by the pixel clock generation circuit 21 by N, and outputs the TMDS clock to subsequent circuits. In addition, when the N-division operation is performed based on division ratio information, the N divider circuit 22 outputs, to the video output circuit 2b, information regarding division ratio N.

The video output circuit 2b includes an output memory that retains data Da0 for channel CH0, data Da1 for channel CH1, and data Da2 for channel CH2. To the respective channels, transmission of video data da1 of R, G, or B is assigned. Data of each of the channels contain the video data da1, audio data da2, and control data da3. The data of each of the channels are data loaded through decoding of compressed data read out from a recording medium included in the transmission device 2, and data inputted from outside. The video data da1 of each of the channels is raster scan data assigned to a display period for display driving in the reception device 3. The audio data da2 and the control data da3 of each of the channels are packet data that are time multiplexed with a blanking period that is a vertical blanking period and horizontal blanking period outside of a display period.

The control data da3 is generated in accordance with the content of video data or audio data by the video output circuit 2b. The control data da3 contains a synchronization signal used for synchronizing videos, attribute data indicating attributes of video data and audio data, and a control signal used for controlling the reception device 3.

The attribute data contains data referred to as InfoFrame which is information used for controlling the reception device 3. Of the InfoFrame, an InfoFrame referred to AVI Infoframe exists, which specializes in performing control using video data information. The VIC is data described inside the AVI InfoFrame. One of the contents represented by the VIC includes a frame rate of a video. The reception device 3 that has received the control data da3 ordinarily displays videos at the frame rate described in the VIC.

When the video output circuit 2b receives information regarding division ratio N from the N divider circuit 22, the video output circuit 2b adds, to the control data da3, data having described therein the value of division ratio N in VSIF (Vendor Specific InfoFrame).

As described above, for example, the data Da0 for the channel CH0 contains the video data da1, the audio data da2, and the control data da3 consisting of the synchronization signal and the attribute data, and is transmitted to the channel CH0 as described later. The data Da1 for the channel CH1 contains the video data da1, the audio data da2, and the control data da3 consisting of the control signal and the attribute data, and is transmitted to the channel CH1 as described later. The data Da2 for the channel CH2 contains the video data da1, the audio data da2, and the control data da3 consisting of the control signal and the attribute data, and is transmitted to the channel CH2 as described later. In a clock channel CK-CH, the TMDS clock is transmitted.

At a timing when the TMDS clock is outputted from the N divider circuit 22, the video data da1 of 8-bit parallel, the audio data da2 of 4-bit parallel, and the control data da3 of 2-bit parallel are read out in the TMDS output circuit 2c. The TMDS output circuit 2c includes a TMDS encoder en0 for the channel CH0, a TMDS encoder en1 for the channel CH1, and a TMDS encoder en2 for the channel CH2. The data Da0 for the channel CH0 is inputted to the TMDS encoder en0, the data Da1 for the channel CH1 is inputted to the TMDS encoder en1, and the data Da2 for the channel CH2 is inputted to the TMDS encoder en2.

Each encoder includes an 8-bit to 10-bit converter BT1, a 4-bit to 10-bit converter BT2, and a 2-bit to 10-bit converter BT3. The video data da1 is inputted to the 8-bit to 10-bit converter BT1 and is encoded into data in 10 bits. The audio data da2 is inputted to the 4-bit to 10-bit converter BT2 and is encoded into data in 10 bits. The control data da3 is inputted to the 2-bit to 10-bit converter BT3 and is encoded into data in 10 bits.

Each of the data encoded in 10 bits is outputted to the transmitter 2d. The transmitter 2d includes a timing generation circuit 23 and a data selector/serial converter 24. The timing generation circuit 23 generates, from the TMDS clock outputted from the N divider circuit 22, a timing signal of data which the transmitter 2d outputs to a TMDS transmission path.

The data selector/serial converter 24 selects the control data da3, the audio data da2, and the video data da1 which are parallel data in 10 bits at the timing of the TMDS clock, and arranges those in the order of transmission timing to convert those into serial data. Then, the data selector/serial converter 24 outputs the generated serial data to the TMDS transmission path from an output buffer, one bit at a time, in accordance with the timing signal. The data selector/serial converter 24 can be achieved by, for example, a serializer.

In the manner described above, each of the data is transmitted through the channel CH0 (DATA0), the channel CH1 (DATA1), and the channel CH2 (DATA2). Through the clock channel CK-CH, the TMDS clock that specifies a timing of every 10 bits is transmitted.

Figure 2:
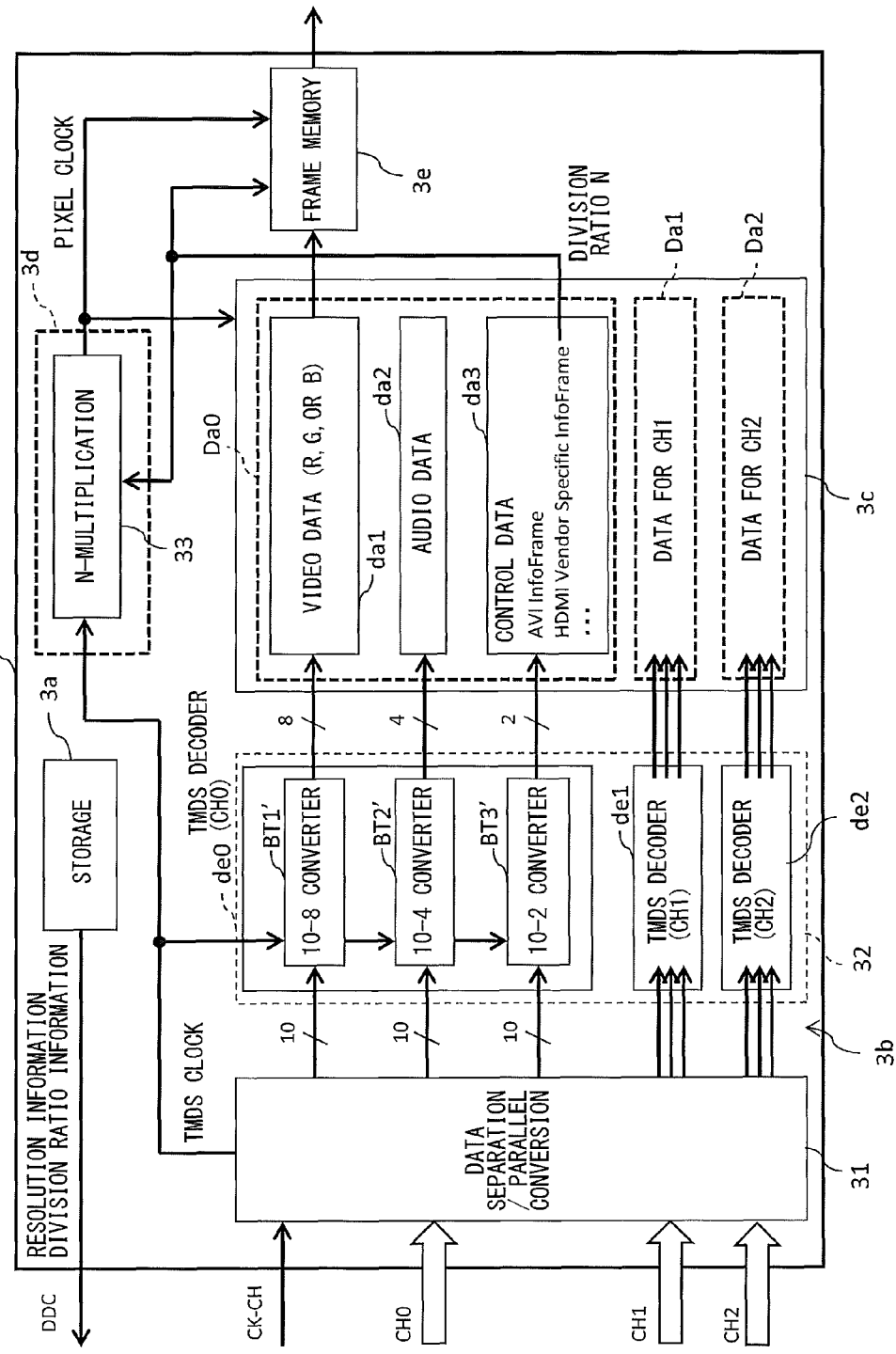
FIG. 2 shows an embodiment of the present invention, and is a block diagram showing a configuration of a reception device.

FIG. 2 shows a detailed configuration of the reception device 3.

The information storage 3a stores therein an EDID. In the EDID, information regarding video specification that is supported by the reception device 3, such as the video format, function, characteristics, and the like that can be handled by the reception device 3, are described. In the present embodiment, information indicating that reception is possible at a frame rated reduced through division of the standard frame rate by a certain number is newly described in a VSDB (Vendor Specification Data Block) of the EDID. The reduced frame rate that is described is 1/N of the standard frame rate, and the value of N is read by the transmission device 2 of the microcomputer 2a through the DDC as the division ratio information. Resolution information indicating a vertical resolution and a horizontal resolution that are supported by the reception device 3 is also read out by the microcomputer 2a.

The TMDS input circuit 3b includes a data separator/parallel converter 31 and a TMDS decoder 32. The data separator/parallel converter 31 receives data via a TMDS transmission path by a receiver that is not diagrammatically represented, separates each of the received serial data that is in 10 bits by using the TMDS clock received from the clock channel, and converts that into parallel data using an internal clock. The data separator/parallel converter 31 outputs the TMDS clock to the TMDS decoder 32 and the synchronization signal generator 3d. The data separator/parallel converter 31 can be achieved by, for example, a deserializer.

The TMDS decoder 32 decodes parallel data in 10 bits to parallel data in 8 bits. The TMDS decoder 32 includes a TMDS decoder de0 for the channel CH0, a TMDS decoder de1 for the channel CH1, and a TMDS decoder de2 for the channel CH2. The data for the channel CH0 is inputted to the TMDS decoder de0, and the data for the channel CH1 is inputted to the TMDS decoder de1, and the data for the channel CH2 is inputted to the TMDS decoder de2.

Each of the decoders includes a 10-bit to 8-bit converter BT1', a 10-bit to 4-bit converter BT2', and a 10-bit to 2-bit converter BT3'. The data for the channel CH0 is inputted to the 10-bit to 8-bit converter BT1' and is decoded into the video data da1 in 8 bits. The data for the channel CH1 is inputted to the 10-bit to 4-bit converter BT2' and is decoded into the audio data da2 in 4 bits. The data for the channel CH2 is inputted to the 10-bit to 2-bit converter BT3' and is decoded into the control data da3 in 2 bits. In the manner described above, the data Da0, Da1, and Da2 are decoded. There are cases where the TMDS decoder 32 properly processes the received video data based on the attribute data or the control signal.

The data Da0, Da1, and Da2 decoded to 8 bits are retained in the reception memory 3c. The synchronization signal generator 3d includes an N multiplier circuit 33. The N multiplier circuit 33 identifies whether or not the control data da3 retained in the reception memory 3c holds information of the division ratio N and the information regarding a horizontal resolution and a vertical resolution. When the control data da3 holds the information of the division ratio N, the N multiplier circuit 33 generates a pixel clock by frequency multiplying the TMDS clock outputted from the data separator/parallel converter 31 by N. When the control data da3 does not hold the information of the division ratio N, the N multiplier circuit 33 generates the pixel clock using N=1. In addition to that described above, the synchronization signal generator 3d generates various timing signals used for display driving, including a vertical synchronization signal and a horizontal synchronization signal from information regarding the synchronization signal and the control signal received from the transmission device 2 and held by the control data da3.

The synchronization signal generator 3d reads video data for a single frame from the reception memory 3c and writes the data in the frame memory 3e at a timing (first timing) of the pixel clock generated by the N multiplier circuit 33. The same video data da1 is retained in the frame memory 3e until data of a new frame is retained in the reception memory 3c, and the same video data da1 is repeatedly read and used for N number of times to output video to a display device at a timing (second timing) of the pixel clock generated by the N multiplier circuit 33. The first timing is different from the second timing in that the first timing is a timing of a period excluding the duration in which the same video data da1 is retained in the frame memory 3e among the pixel clock. For the purpose of causing the same video data da1 to be retained in the frame memory 3e until data of a new frame is retained in the reception memory 3c, the information of the division ratio N read out from the control data da3 is also provided to the frame memory 3e.

The reception device 3 has an advantage of being able to use the configuration of a conventional reception device almost without any modifications, since the reception device 3 has a configuration obtained by merely adding the items described by the information storage 3a in the EDID, and a configuration that is achievable by changing the division ratio of a frequency synthesizer at which the N multiplier circuit 33 generates the synchronous clock.

(Configuration for Power Consumption Reduction)

In the following, it will be described how achieving power consumption reduction is made possible by adding information to the conventional HDMI specification, using the configuration shown in FIGS. 1 to 3.

In a transmission device compliant with HDMI specification, a frame rate is transmitted to a reception device using the VIC. Here, when the same image is extendedly outputted in a predetermined number of multiple frames or more as in the case with a still picture, the same image will be continuously displayed at the frame rate with conventional technology. However, with the configuration of the present embodiment, the transmission device 2 transmits a video signal at a rate lower than the usual frame rate. The reception device 3 outputs the video signal transmitted at a lower-than-usual rate as a video at an ordinary frame rate. In such manner, it is possible to reduce the amount of data flowing in a transmission path, and prevent reduction of the frame rate of a video that is displayed. Since the amount of data flowing through a transmission path can be reduced, power consumption of a physical interface that performs the actual transmission and reception is reduced.

Figure 4:
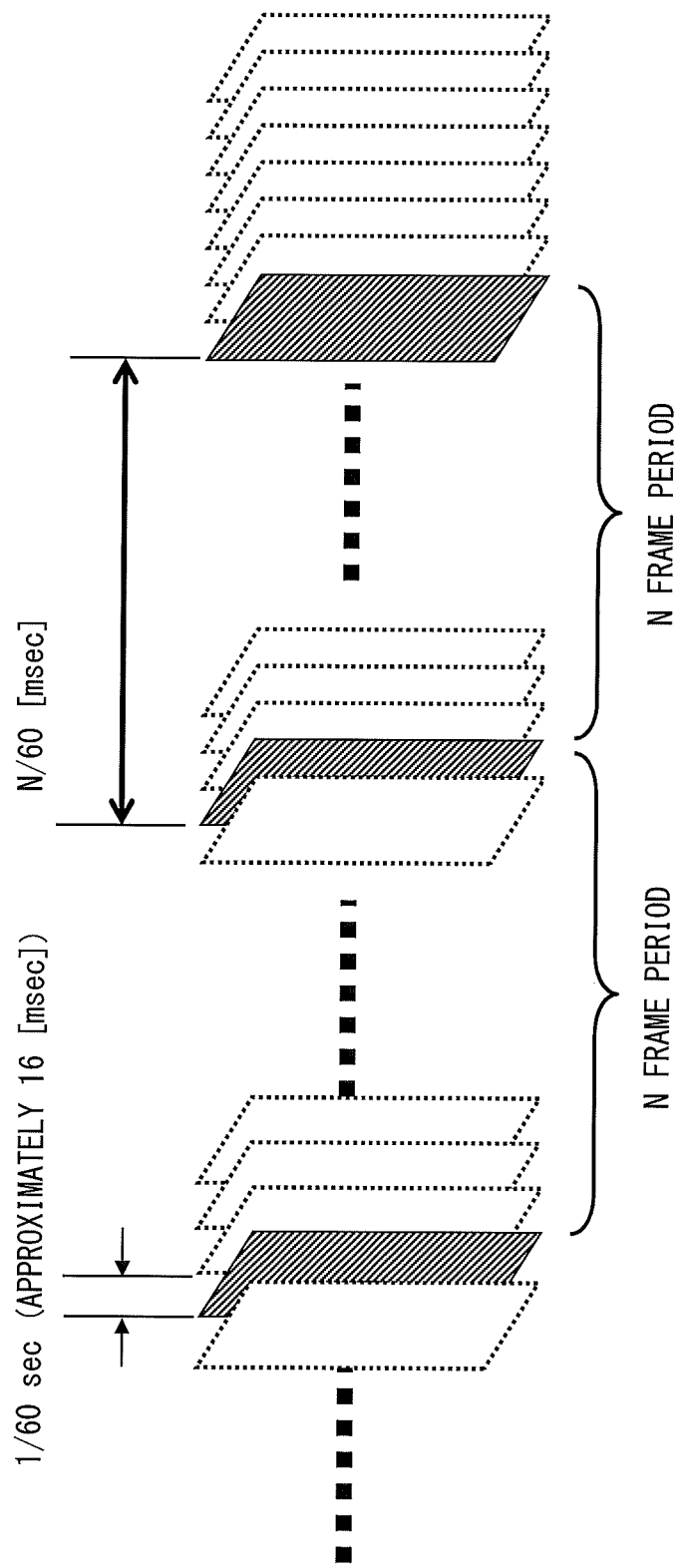
FIG. 4 is for describing the manner in which a video signal is transmitted at a reduced frame rate.

FIG. 4 is a conceptual diagram for describing the reduction of frame rate by the transmission/reception system 1. When transmission is performed at a frame rate of 1/60 seconds (60 Hz), video data is transmitted in approximately every 16 milliseconds. However, for example, when the division ratio is N=8, since transmission is performed at a frame rate of 8/60 seconds (approximately 7.5 Hz), a transmission interval of 8 frame periods=133 milliseconds becomes vacant. For example, when displaying at 4k/30p, although the transmission rate is 2.97 Gbps in the ordinary frame rate, the transmission rate becomes approximately ⅛ of that of 370 Mbps when N=8.

(Description of New Data to EDID)

FIG. 5 shows an illustrative example of a case in which the information storage 3a newly describes, in the EDID, information indicating reception is possible at a frame rate obtained by dividing an ordinary frame rate by a certain number. FIG. 5 shows the data structure of the VSDB. In the VSDB, byte blocks having a size of 1 byte are arranged in order, and header information, storage address, and the like are defined on the top block side. Reserved bit areas represented by Rsvd (0) exist in byte blocks shown subsequent to the n-th block in the low order. In the present embodiment, "Low Reflesh" indicating that processing at a reduce frame rate is possible is defined in the reserved bit areas using, for example, a single bit. Described in a subsequent block is the value of N indicating the value of the reduced frame rate that is supported.

Here, N is the division ratio used by the transmission device 2 for generating the TMDS clock. When the division ratio is N=2, this indicates that only 2 is possible. When the division ratio is N=8, this indicates that there are three possible values of 2, 4, and 8. It is possible to describe the number of values that N can take in individual byte blocks. However, when the supported frame rate includes multiple values represented by the power of two, it becomes possible to suppress enlargement of the storage size for the EDID by only describing a maximum value of the values represented by the power of two as information of a frame rate regarding each of the values represented by the power of two. Since the ROM that stores the EDID only has a small finite area of storage capacity of generally about 256 bytes, not having extra space is common in the reserved bit areas. Therefore, by suppressing enlargement of the storage size consumed to achieve the present function, an advantageous effect of being able to secure storage areas to be consumed to achieve other functions can be obtained.

As described above, as a result of describing information in the EDID regarding a reduced frame rate that is supported by the reception device 3 to enable reading by the transmission device 2, it becomes possible to prevent the transmission device 2 from transmitting signals at a frame rate that cannot be accepted by the reception device 3.

Furthermore, when a predetermined frame rate that is supported is common for a specific set of multiple video specifications, a mask field indicating that information regarding the predetermined frame rate only applies to the specific set of multiple video specifications may be stored in the information storage 3a. For example, when a division ratio N is not applicable to all VIC lists but only applicable to a specific set of multiple VIC lists, mask data for only extracting the specific set of multiple VIC numbers from all VIC numbers is described in a mask field. With this, enlargement of the storage size of the EDID can be further suppressed.

(Creation of New InfoFrame)

As described above, in the transmission device 2, a new InfoFrame is defined as one of the attribute data. In the InfoFrame (hereinafter, referred to as new InfoFrame), information regarding how much the frame rate is to be reduced is described. As a specific example, in a case where information regarding transmission of video signals is to be performed at a frame rate obtained by dividing the frame rate described in the VIC by a certain number is described in the VSIF, for example, when the frame rate described in the VIC is 60 Hz and the frame rate for transmission is 7.5 Hz, "8" is described in the new InfoFrame.

Doing so as described above has the following advantage. That is, by having the reception device 3 perform a calculation using the frame rate described in the VIC and the numerical value described in the new InfoFrame, it is possible to easily recognize how much the frame rate is reduced. The reception device 3 can recognize the frame rate in which videos should be outputted originally through a conventional method compliant with HDMI specification.

FIG. 6 shows an illustrative example describing the value of the division ratio N in the VSIF. In the VSIF, byte blocks having a size of 1 byte are arranged in order, and header information, storage address, and the like are defined on the top block side. The type of video format is described in from the fifth bit to the seventh bit of block PB4, and, for example, "100" indicating that the type of video format is "Low Reflesh mode" is described using three bits in the HDMI_Video_Format field in FIG. 6. This "100" can be defined by, for example, selecting the number reserved for defining the type of video format for HDMI. The value of N in the subsequent block PB5 is described as "D" when the "Low Reflesh mode" is defined in the block PB4. Here, in a case where it is indicated that multiple division ratio can be processed as in the case with N=8 in the EDID of the reception device 3, a single value can be selected as N described as "D" from a range that is supported by the reception device 3 as in the case with 2, 4, or 8.

At present, when a frame rate value uniquely defined by a VIC value transmitted in an AVI_InfoFrame transmitted separately to the new InfoFrame is "A," a combination of this value with the "D" value represents that the frame rate of the HDMI signal presently transmitted is A over D (=A/D). It should be noted that there is no change in the value defined by the original VIC value for the horizontal resolution and vertical resolution of the video that is transmitted.

It is also possible to not use the VIC and the new InfoFrame, and the transmission device 2 may use another method to notify, through a different means, the reception device 3 regarding the horizontal resolution and vertical resolution, and the frame rate at which the transmitted video should be outputted. A conceivable method is, for example, adding a signal line to notify the rate. However, the method of using the new InfoFrame has advantages of being able to adhere to the configuration of a conventional HDMI apparatus and only requiring a small amount of calculation.

(Continuation of Clock Channel)

With the conventional HDMI specification, a clock of a video signal is transmitted in the clock channel. Here, when the transmission system has a configuration using a frame rate lower than the original frame rate as in the configuration of the present embodiment, the clock will naturally be slow. In the transmission/reception system 1 described above, the TMDS clock is transmitted at a rate of 1/N. However, the clock transmitted in the clock channel may be transmitted as the original clock of the video signal. That is, for example, in a case with a video at 1080p/60 Hz, the video signal clock has a clock speed of 148.5 MHz, and transmission continues at this clock even when the frame rate becomes low. Doing so has an advantage of being able to achieve a clock generation circuit on the reception side with a configuration identical to a conventional one.

The transmission of the clock and video data is continuously performed even when the TMDS clock is transmitted at a rate of 1/N or at the original clock rate. When transmitting at the original clock rate, even if the video signal is switched to one that is not 1/N of the original rate, it becomes unnecessary to resynchronize the clock at the reception side, and seamless output of videos becomes possible. Since the control data da3 contains information of the division ratio N and reduction of the frame rate can be recognized on the reception device 3 side, not having changes made to the transmission rate of the clock does not result in reception trouble.

Figure 7:
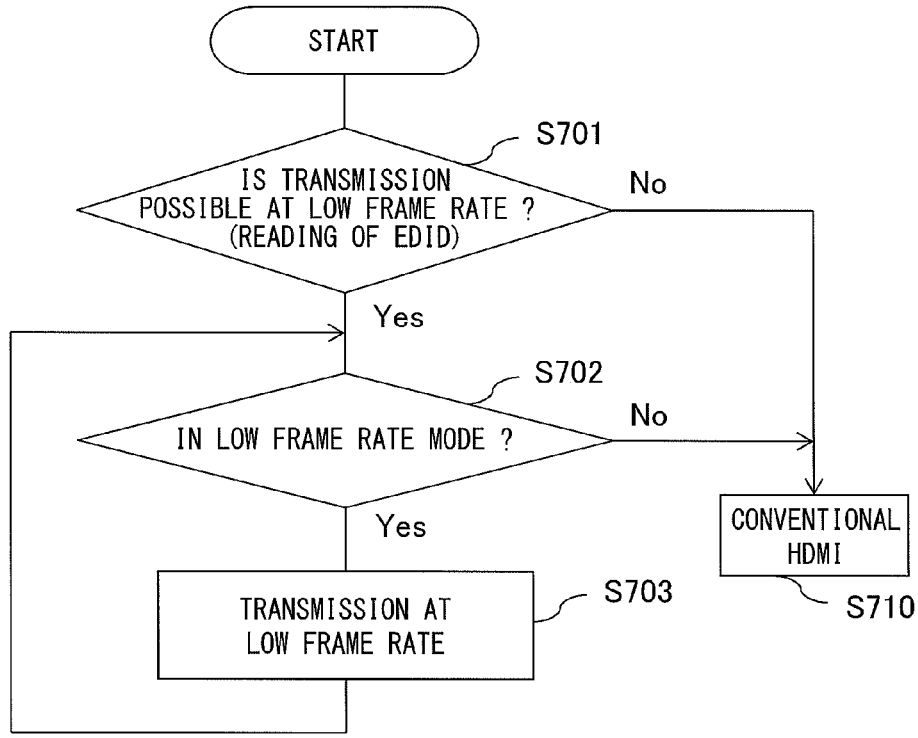
FIG. 7 is a flowchart describing operations of the transmission device in FIG. 1.

FIG. 7 shows a flowchart describing operations of the transmission device 2. These operations can be achieved by a control program or through hardware operations.

The microcomputer 2a reads whether reception is possible at a low frame rate from the information storage 3a in the reception device 3 when power is turned on, when a cable is connected, or the like (step S701). As a result of the reading, when reception cannot be performed at a low frame rate, it is determined that transmission should be performed with the conventional HDMI transmission method (S710). When a mode in which transmission is possible in a low frame rate is executed such as when output from the video output circuit 2b is a still picture or when the frame rate is low, transmission is initiated in the low frame rate mode of the present embodiment (S702).

The microcomputer 2a outputs, in a packet (InfoFrame) of the blanking period, each data, clock, and a control signal indicating a video signal is in the low frame rate transmission mode (S703), and, when the low frame rate transmission mode is not executed, determines that transmission should be performed with the conventional HDMI transmission method (S710).

Figure 8:
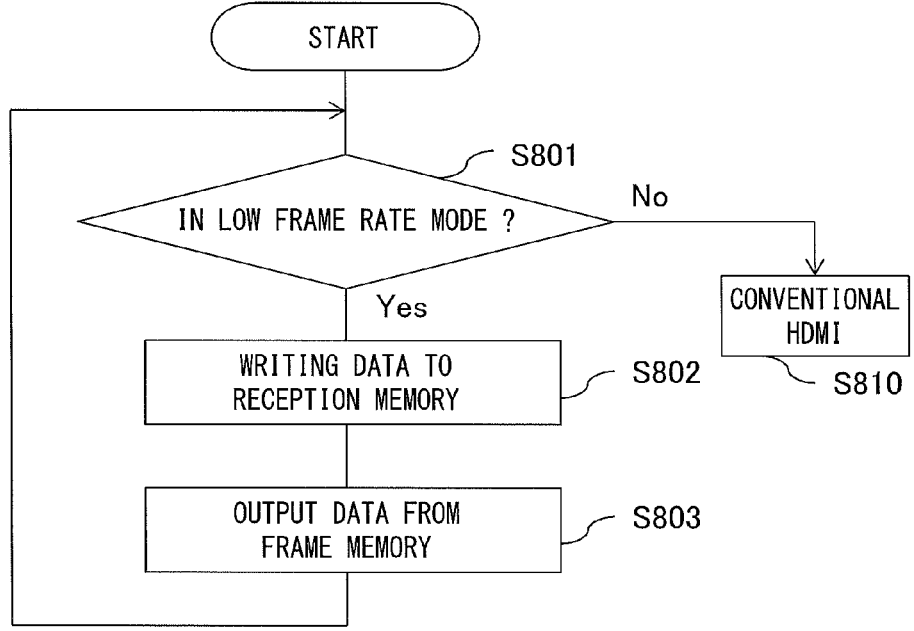
FIG. 8 is a flowchart describing operations of the reception device in FIG. 2.
Figure 9:
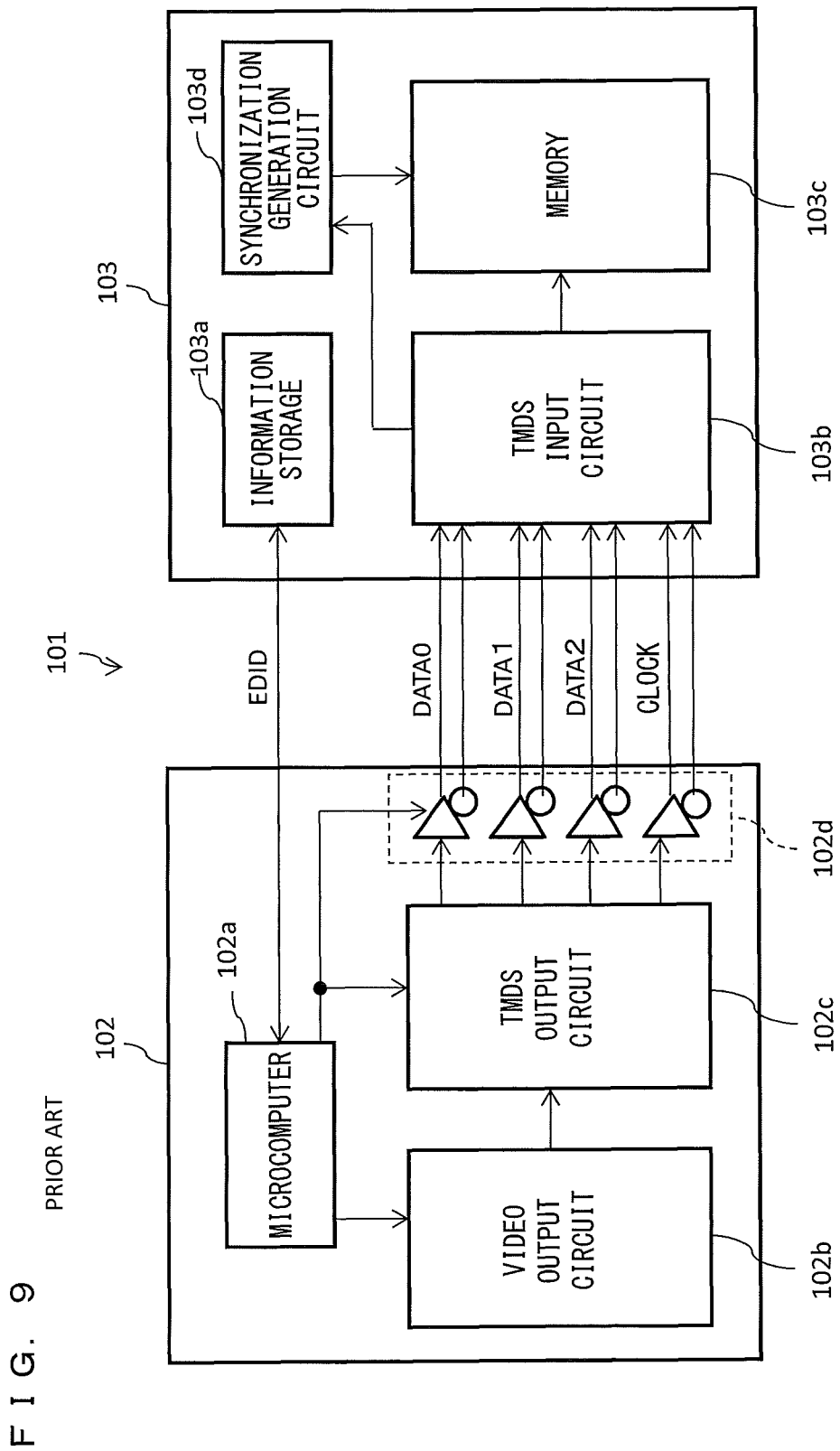
FIG. 9 shows a conventional technology, and is a block diagram showing a configuration of a transmission/reception system that performs transmission and reception through HDMI specification.
Figure 10:
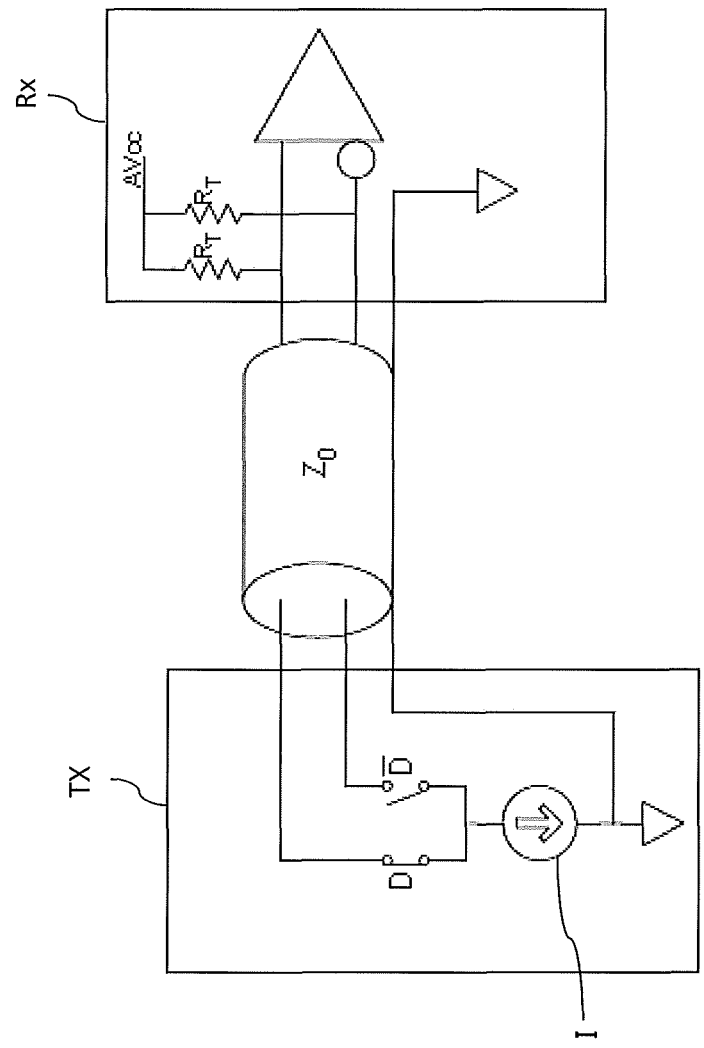
FIG. 10 shows a conventional technology, and is a circuit diagram showing a configuration of a transmission path for TMDS method.

FIG. 8 shows a flowchart describing operations of the reception device 3. These operations can be achieved by a control program or through hardware operations.

Then, a signal is read, including information indicating whether execution of the low frame rate transmission mode is superimposed on the packet (new InfoFrame) of the blanking period of the transmitted video signal (S801), and, when the low frame rate transmission mode is not executed, the conventional HDMI reception is performed (S810).

When a flag for the low frame rate transmission mode is detected, the video signal transmitted from the transmission device 2 is written as video image in area n+1 of the reception memory 3c (S802). At this moment, loading (displaying) of the video signal to the frame memory 3e is performed by reading video data at an area n of the reception memory 3c used as storage at the latest renewal of videos.

When writing of the video signal to the reception memory 3c is completed, the video signal is read out from the frame memory 3e and displayed using the synchronization signal generated by the synchronization signal generation circuit 3d for displaying the video signal from the area n+1 in the reception memory 3c (S803).

The present embodiment has been described above.

The configurations of the present embodiment also include one in which the information storage 3a described in FIG. 1 is realized through communication by CEC (Consumer Electronics Control).

It should be noted that, when transmitting with a main link of uncompressed video data through DP (Display Port) technology, data may be inserted similarly to a blanking period. With DP, loading EDID from the sync to the source is performed in an AUX channel, and the clock channel does not exist since there is asynchronous transmission. In addition, during TMDS transmission of uncompressed video data performed with a DVI (Digital Visual Interface), data may be inserted similarly to the blanking period. With the DVI, loading EDID from the sync to the source is performed through a DDC (Display Data Channel). It is also possible to perform uncompressed data transmission with a transfer specification other than those described above, or perform uncompressed data transmission through wireless communication.

In addition, a repeater may intermediate the communication between the transmission device and the reception device.

INDUSTRIAL APPLICABILITY

The present invention is particularly useful as a transmission method for transmitting a still picture in way compliant with the conventional HDMI specification.

DESCRIPTION OF THE REFERENCE CHARACTERS 1 transmission/reception system
2 transmission device
2a microcomputer
3 reception device
3a information storage
3d synchronization signal generator
3e frame memory
N division ratio

The invention claimed is:

1. A transmission device configured to transmit, to a reception device, signals including a video signal, the transmission device comprising:
    a controller configured to perform a control of reading information held by the reception device regarding a video specification that is supported, and transmitting the video signal that is supported by the reception device; and
    a transmitter configured to transmit the video signal in a form of baseband video data, wherein
    when the reception device is in an output mode in which an identical image is extendedly shown in a predetermined number of multiple frames or more,
    the controller performs a control of reading, from the information regarding the video specification, information regarding a horizontal resolution and a vertical resolution that are supported by the reception device and information regarding frame rate that is supported by the reception device, and multiplexing, to the video signal during a blanking period of the video signal, information indicating a reduced frame rate that is selectable from a range supported by the reception device, and
    the transmitter transmits the baseband video data at the reduced frame rate.

2. The transmission device according to claim 1, wherein the information indicating the reduced frame rate is information regarding division ratio with respect to a frame rate prior to reduction.

3. The transmission device according to claim 1, wherein when the transmitter transmits a clock, transmission is performed without reducing transmission rate of the clock in the output mode.

4. A reception device configured to receive signals containing a video signal, the reception device comprising:
    a storage configured to store information regarding a video specification that is supported including information regarding a frame rate that is supported;
    a receiver configured to receive signals containing a video signal formed from baseband video data;
    a frame memory in which the video signal received by the receiver is written; and
    a synchronization signal generator configured to generate a first timing at which the video signal is written in the frame memory from the receiver, and a second timing at which the video signal is read out from the frame memory, wherein
    the receiver outputs, when information indicating a reduced frame rate and information indicating a horizontal resolution and a vertical resolution during a blanking period of the received video signal are superimposed, the information indicating the frame rate to the synchronization signal generator, and
    the synchronization signal generator generates the first timing at a frame rate in accordance with the information regarding the horizontal resolution and the vertical resolution and the information indicating the reduced frame rate.

5. The reception device according to claim 4, wherein when the supported frame rate includes multiple values represented with a power of two, only a maximum value of the values represented by the power of two is stored in the storage as information of a frame rate regarding each of the values represented by the power of two.

6. The reception device according to claim 4, wherein when a predetermined frame rate that is supported is common for a specific set of multiple video specifications, a mask field indicating that the information regarding the predetermined frame rate only applies to the specific set of multiple video specifications is stored in the storage.

7. A transmission/reception system comprising: a transmission device configured to transmit signals containing a video signal, and a reception device configured to receive signals containing the video signal,
    the transmission device including:
        a controller configured to perform a control of reading information held by the reception device regarding a video specification that is supported, and transmitting the video signal that is supported by the reception device; and
        a transmitter configured to transmit the video signal in a form of baseband video data, wherein
        when the reception device is in an output mode in which an identical image is extendedly shown in a predetermined number of multiple frames or more,
        the controller performs a control of reading, from the information regarding the video specification, information regarding a horizontal resolution and a vertical resolution that are supported by the reception device and information regarding frame rate that is supported by the reception device, and multiplexing, to the video signal during a blanking period of the video signal, information indicating a reduced frame rate that is selectable from a range supported by the reception device, and
        the transmitter transmits the baseband video data at the reduced frame rate, and
    the reception device including:
        a storage configured to store information regarding the video specification that is supported including the information regarding a frame rate that is supported;
        a receiver configured to receive signals containing the video signal transmitted from the transmission device;
        a frame memory in which the video signal received by the receiver is written; and
        a synchronization signal generator configured to generate a first timing at which the video signal is written in the frame memory from the receiver, and a second timing at which the video signal is read out from the frame memory, wherein
        the receiver outputs, when information indicating the reduced frame rate and information indicating a horizontal resolution and a vertical resolution during a blanking period of the received video signal are superimposed, the information indicating the reduced frame rate to the synchronization signal generator, and
        the synchronization signal generator generates, at the reduced frame rate, the first timing in accordance with information indicating the reduced frame rate.

* * * * *